Sept. 20, 1938.  W. LINTERN ET AL  2,131,017
BODY AND ENGINE TEMPERATURE CONTROL SYSTEM FOR MOTOR VEHICLES
Filed Dec. 16, 1935  2 Sheets-Sheet 1

INVENTORS.
William Lintern &
John B. Lintern,
BY J. Harrod Leonard,
their ATTORNEY.

LEGEND.
W ----- WATER HEAT EXCHANGER.
X —·— AIR TEMP. FROM W.
A ----- EXHAUST HEAT EXCHANGER.
B —·— AIR TEMP. FROM A.
C ——— RESULTANT HEAT OF BODY.
T ——— RESULTANT ENGINE TEMPERATURE.

Patented Sept. 20, 1938

2,131,017

UNITED STATES PATENT OFFICE 2,131,017

BODY AND ENGINE TEMPERATURE CONTROL SYSTEM FOR MOTOR VEHICLES

William Lintern and John B. Lintern, Cleveland, Ohio, assignors, by mesne assignments, to Evans Products Company, Detroit, Mich.

Application December 16, 1935, Serial No. 54,612

4 Claims. (Cl. 237—12.3)

This invention relates to motor vehicles and particularly to an improved vehicle body heating and engine temperature control system by which more uniform and efficient heating of the interior of the body is provided and the engine is automatically maintained at a proper temperature for efficient operation.

One of the principal objects of the present invention is to operatively relate the cooling media of the engine and the heat provided by the discharged exhaust products from the engine in a manner such that both contribute heat to the body when the engine is operating at proper temperature and the heat of the exhaust products is added automatically to the cooling media of the engine as the engine temperature drops below a predetermined degree.

Another object is to heat the air supplied into the body both by heat from the engine exhaust products and from the engine cooling media preparatory to the general diffusion of the air throughout the interior of the body.

Another object is to heat the body by an air swept exhaust heat exchanger and to modulate the heat of the air by absorbing part of such heat in the engine cooling media when the temperature of the cooling media is below that required for efficient engine operation and by augmenting, automatically, such heat by adding heat from the engine cooling media when the engine is working at proper operating temperature.

A more specific object is to heat the air introduced into the body by an exhaust heat exchanger initially and to pass the heated air therefrom into intimate heating relation to a water heat exchanger connected with the water cooling system of the engine prior to the general diffusion of the air throughout the body.

Another specific object is to modulate the heat exchanging effect of one exchanger by the other by maintaining the exchangers in intimate heat exchanging relation with each other.

Figure 1:
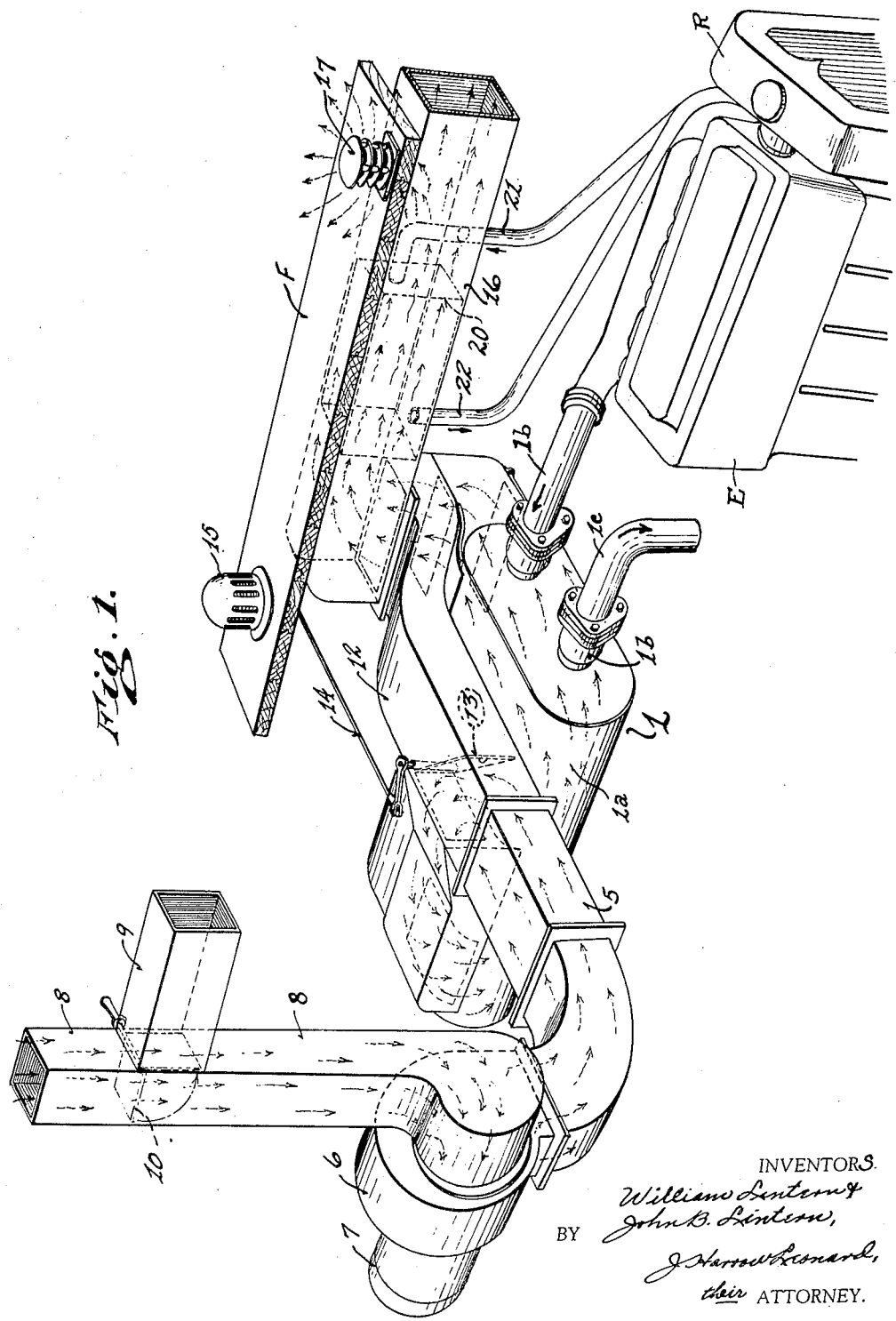
Figure 2:
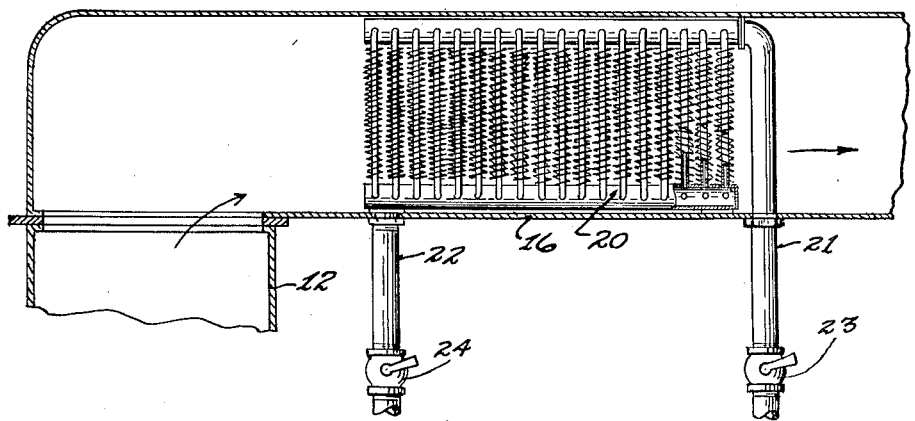
Figure 3:
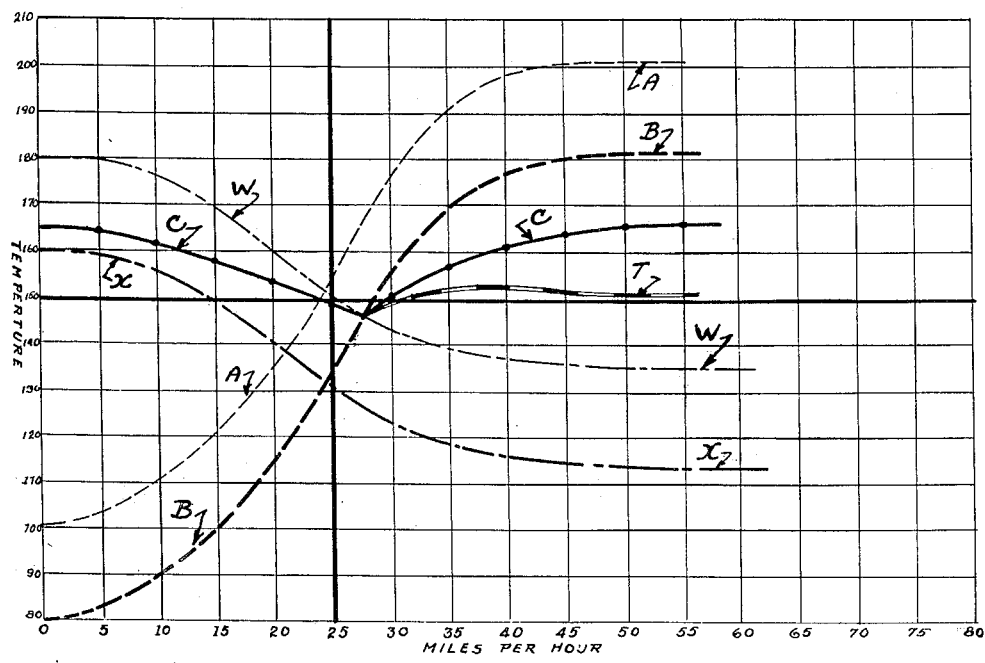

Other objects and advantages will become apparent from the following specification wherein reference is made to the drawings in which Fig. 1 is a perspective view of a system embodying the principles of the present invention;

Fig. 2 is an enlarged fragmentary sectional view of the distribution duct of Fig. 1, with a water heat exchanger installed therein; and Fig. 3 is a graphical illustration of the combined effect of the heat exchangers.

The present invention is particularly useful in connection with large commercial passenger motor coaches and particularly those utilized in city transportation wherein the coach operates at widely varying speeds and stops often for short intervals for taking on and discharging passengers. A particular installation of the system for use in connection with such coaches will be described, the use with other motor vehicles being readily apparent therefrom.

In motor coaches of this character, the common practice has been to heat the coach either by an exhaust heat exchanger heated by the products of combustion from the engine or by a water heat exchanger comprising a small radiator within the body and connected with the main radiator of the engine for the circulation of the water or cooling media of the engine therethrough.

Exhaust heaters are very effective when the engine is operating at a moderate or high speed, and especially when under heavy load. Water heaters, on the contrary, are effective when the engine is idling or the vehicle moving at low speed. At higher speeds, the much greater volume of air passing through the outside radiator of the engine greatly reduces the temperature of the cooling media, often chilling the engine below efficient operating temperatures, and also rendering the cooling media ineffective for heating the interior of the coach body. If the radiator is covered, so as to reduce the passage of cooling air therethrough, there is great danger of overheating of the engine when it is idling.

Many city transportation coaches do not use anti-freeze mixtures in cold weather, due to the fact that the short stops and slower speeds do not require such, as so little heat is radiated from the main radiator that the engines are maintained at non-freezing temperature. If, however, this cooling media is passed through a radiator within the body, and a large volume of outside air blown thereover, freezing of the water cooling system results. Even though freezing may not result in all instances, the temperature of the engine is so lowered that efficient operation is impossible. All of these objectionable features are overcome by the structure herein described and automatic modulation of the heat discharged into the body and the temperature of the engine is maintained entirely by the thermal interchange between the heat exchangers related as herein described.

Referring to Fig. 1, the apparatus is shown installed in a motor coach such as described in the copending application of William Lintern, Serial No. 32,905, filed July 24, 1935. For simplicity in illustration, only a floor portion F of the motor coach body is illustrated. The motor coach has an engine, shown diagrammatically at E, and the conventional outside radiator R connected in the water cooling system of the engine block. Beneath the floor F of the motor coach body is mounted an exhaust heat exchanger 1 comprising an air tight housing 1a into which extends an exhaust pipe 1b, leading from the exhaust manifold of the engine and discharging through a connection 1c leading to the muffler. In the type of motor coach referred to for illustration, the engine E is located beneath the floor and close to the center of the coach.

An air supply duct 5 leads into the housing 1a of the exchanger 1 for supplying air therethrough into heating relation with the heated exhaust pipe 1b, the air being forced through the duct 5 by a suitable blower 6, which is driven by an electric motor 7. Air is admitted to the blower 6 through a suitable intake 8 which, as described in the above identified application, may lead upwardly, thence forwardly in the coach body so as to receive air at the forward end of the body, the air being forced into the duct 8 consequent upon forward motion of the vehicle. A recirculating duct 9 which opens into the body is also provided and is connected to the duct 8, a damper 10 being provided at the juncture of the ducts 8 and 9 so as to completely close either or proportion the amount of air admitted from the two concurrently. Thus, if desired, both fresh outside air or air which is partly fresh and partly recirculated may be supplied to the blower.

Connected to the air duct 5 is a by-pass duct 12. A suitable valve 13, operated by a lever 14 which, in turn, is operated by a thermostat 15 within the coach body, is provided at the inlet of the exhaust heat exchanger 1 and is so arranged that all of the air supplied through the duct 5 may be passed directly through the heat exchanger 1, as indicated by the arrows, or part, or all, of said air may be by-passed around the heat exchanger 1 through the by-pass duct 12. Leading from the by-pass duct 12, beyond the point of connection thereof with the exchanger 1, is a distribution duct 16, part only of which is shown. The distribution duct 16 extends along the underside of the floor of the coach and at spaced points along its length is provided with discharge ports opening into the interior of the coach body for diffusing the air uniformly therethrough. The various discharge ports are protected by suitable deflectors 17. The distribution duct 16 is connected, at its inlet end, with both the housing of the heat exchanger 1 and the by-pass duct 12, so as to receive the air passing through either or both.

Before the diffusion of the air from the heat exchanger 1 into the body, this air is passed through or in intimate heat exchanging relation to a heat exchanger 20 which is connected to the cooling system of the engine. In the illustrative example, a water cooled engine is provided, and the heat exchanger 20 is in the form of a radiator similar to the conventional outer radiator R of the engine. The exchanger 20 is located in the path of the air passing from the heat exchanger 1. A convenient location for the heat exchanger 20 is within the duct 16 in advance of its discharge ports and just beyond the heat exchanger 1. The heat exchanger 20 is connected by suitable pipes 21 and 22 to the radiator R or water cooling system of the engine E so that the cooling water of the engine may circulate readily therethrough. Suitable valves 23 and 24 are provided for completely shutting off the heat exchanger 20 when desired. Thus the heat exchangers are brought into intimate heat exchanging relation.

In the structure illustrated, either completely fresh or recirculated air, or both, may be passed continuously through the heat exchanger 1 and thence, progressively and before diffusion throughout the body, through the heat exchanger 20. If, as sometimes happens, the heat exchanger 1 discharges directly into the body, the heat exchanger 20 should be placed directly in the discharge path thereof so that the well defined stream of heated air passes through the exchanger 20 before it is diffused throughout the body.

The operation of the system is best described in connection with Fig. 3. Referring to Fig. 3 a number of curves are illustrated, these curves being plotted on coordinates in which the abscissa represents speed of the vehicle in miles per hour and the ordinate represents the temperature in degrees Fahrenheit. It is assumed that not only the engine is operating at the proper speed for driving the vehicle at the designated miles per hour but that the motor coach is actually traveling at the speed represented, as the movement of the coach makes a considerable difference in the amount of air passed through the radiator R of the engine and loading of the engine changes materially the volume and temperature of the exhaust products. It is assumed also that the outside temperature conditions are such that a temperature of about zero exists.

Referring to the curves in order, the curve W represents the heat available from the water exchanger, assuming that the air may be passed therethrough very slowly so as to be heated to about the temperature of the water therein. The curve A represents the useful temperature of the exhaust heat exchanger, taking into consideration the necessity for a reasonable volume of air, the distance of the exchanger from the engine, outside radiation losses, and size of heat exchanger which may be accommodated in the space available on the vehicle.

The amount of air supplied to the vehicle body, however, is dependent upon the number of passengers, as state statutes require a minimum volume of fresh outside air per passenger, based on full seating capacity. This amount of outside air is therefore fixed for a given vehicle. If all the air required were passed through only one of the exchangers, sufficient heat would not be available under the severe outside conditions. Furthermore, it must be remembered that the passage of the air through the exchangers in the volume required does not permit the air to become heated to the temperature of the particular heat exchanger, the ratio of temperature of heated air to useful temperature of the exchanger always being less than unity. This lag in air temperature is determinable and in the present installation is about 20°, both as to the exhaust exchanger and the water exchanger.

Referring again to the curves, the temperature of the air which normally has passed through the water exchanger when the whole volume of air to be supplied is passed therethrough, is indicated at X, and is consistently below the curve W, due to the lag referred to above. In the case of the exhaust exchanger the air temperature is indicated by curve B and lags about 20° below the useful available temperature of the exhaust exchanger. In the present system, all of the air is passed through the exhaust exchanger 1, (curve A) and then through the water exchanger 20, (curve W) as a result of which accumulative heating effect of curves B and X is obtained and, in addition, a very striking correlative effect is produced.

The correlative effect is the modulation of fluctuations in heat of the air passed into the body. The correlative effect, in turn, results in another equal advantage, namely; that the engine is maintained at more nearly its proper operating temperature at a time when it would normally be chilled much below the temperature required for efficient operation. The modulating effect results not merely from the accumulative heating effects of the two exchangers but from the order in which the air is passed in heating relation thereto.

It is noted that in the arrangement illustrated in Fig. 1, the water exchanger 20 may subtract heat from the air heated by the exhaust exchanger 1, whereas the exhaust exchanger, if operating at a temperature below that of the water exchanger, cannot subtract heat from the water exchanger but pre-warms the air passing to the water exchanger under substantially all conditions.

Referring again to Fig. 3, it is noted that the useful heating of the water exchanger is most effective when the engine is idle or operating very slowly. As the vehicle moves forwardly, however, the volume of air passed through the outside radiator R increases very rapidly. This necessarily lowers the temperature of the water in the cooling system, the lowering being very gradual up to about 10 m. p. hr. Above 10 m. p. hr. the drop is very rapid until a speed of about 35 or 40 m. p. hr. is reached and thereafter the drop is much less rapid.

The useful heat at the exhaust exchanger, however, is very slight up to 10 m. p. hr., though increasing slightly from zero to about 10 m. p. hr. After 10 m. p. hr., it continues increasing at an accelerated rate until, at about 35 m. p. hr. it begins approaching a constant, finally levelling off at about 45 m. p. hr., at a temperature of around 200°. The heating of the air by either of these exchangers standing alone is, therefore, a curve of the same general shape as the useful heat curve of the particular exchanger but disposed bodily lower on the graph, as indicated by the curves X and B.

Here a striking effect should be noted. So long as the temperature of the air, (curve B), from the exchanger 1 is less than that of the exchanger 20, (curve W), both will add heat to the air. Since progressively more heat is added to the air by the exhaust exchanger as the amount added by the water exchanger decreases, the result is the curve C which raises the temperature of the air passing the water exchanger slightly above the curve X at slow speed and a greater amount above the curve X as the curves W and B approach each other. In fact, heat will be added by the exhaust exchanger until the heating of the air thereby is equal, not to the heating of the air by the water exchanger, indicated by curve X, but to the temperature of the water exchanger itself, indicated by the curve W. In other words, the curve C will pass through the intersection of the curve W, the actual useful heat of the water exchanger, and the curve B, the lagging air temperature curve of the exhaust exchanger. This phenomenon occurs at about half way between 25 and 30 miles per hour. Thereafter, to the right of such intersection, the water exchanger, being less in temperature than the lagging air temperature from the exhaust exchanger, indicated by the curve B, will begin absorbing and subtracting heat from the air.

At less than 25 m. p. hr. it should be noted that the curve X has predominated and been augmented by the curve B as indicated by the curve C. However, after a speed of 25 m. p. hr. is reached the curve B predominates. Between 25 and 30 m. p. hr. it might be assumed that, since the curve B is above the curve X, the curve X would immediately cause a subtraction of heat from the curve B. This, however, does not occur because the water exchanger does not subtract from the curve B until such time as the curve W, and not the curve X, is below the curve B, because so long as the heat of the water in the heat exchanger 20 or W is equal to the temperature of the air coming from the exhaust exchanger 1, there will be no absorption of heat from curve B by the exchanger 20. Between these limits, the water exchanger may be of little benefit for heating.

To the right of the point of intersection of the curves B and W, there is a subtraction of heat from the air, curve B, by the water exchanger, curve W. At this point, however, the curve B is rising at a much more rapid rate than the curve W is falling. This subtraction, therefore, lowers the curve C from the curve B so that the resultant curve throughout the range is defined by the curve C. Analyzing curve C, it is apparent that a comparatively uniform temperature is maintained and even the most extreme fluctuations are only 18°, from about 165° maximum temperature to about 148° minimum temperature. The lower limit of temperature, however, exists only throughout the very limited range of speed of between 25 and 30 m. p. hr., and this is a speed at which such vehicles seldom travel. In general, they operate at a much slower speed, often in second gear, during starting and stopping, and, when actually traveling, are traveling above 30 m. p. hr. Thus the lowest temperature in the body exists for only very short intervals, followed and preceded by a temperature of about an average of 160° F. delivered to the distribution duct 16. This fluctuation is not enough to cause discomfort or to be noticed by the passengers. On the other hand, a fluctuation of 30 to 40° F. causes the passengers to feel, at the lower limit, that the air is actually cold, whereas it has merely dropped from 170 to 140°. Thus the lack of heat during continuous running and fluctuations which would result from the water exchanger alone are eliminated. The lack of heat from the exhaust exchanger while idling or traveling very slowly and fluctuations as the speed increases are also eliminated.

Furthermore, the mere summation of the heat from the two exchangers located at different positions in the body give undesirable results. It will be noticed the abrupt changes result in both curves B and X if the exchangers are at widely separated parts of the vehicle body. If widely separated, even though the average temperature in the body is that required, this temperature would not be uniform and passengers near first one exchanger and then near the other would have the feeling that they were subjected to hot and cold drafts. All of these disadvantages are overcome by the structure herein described.

Referring to the final advantage, it will be noted that to the right of the intersection of the curves B and W, the curve C drops below the curve B due to the absorption of heat by the heat exchanger 20 from the air at the temperature of the curve B. Necessarily, to effect this drop, there must be an equal increase in the temperature, not of the air issuing from the water exchanger and indicated by curve X, but in the temperature of the water exchanger itself, defined by the curve W. The difference between curves B and C, which represents the heat absorbed by the exchanger 20, is added to the curve W, and the curve T results to the right of the point of intersection of curves B and W. To the left of this intersection, the curve T will be the same as curve W. The curve T, therefore, represents the temperature of the engine cooling media. Thus the exhaust heat from the products of combustion are added to the cooling media or water system of the engine to offset the rapid dissipation of heat and undue chilling of the engine due to severe outside weather conditions. Consequently, the engine can be maintained at a minimum temperature of about 150° under the most extreme conditions with the result of a considerable increase in efficiency and smoothness of operation. By the use of the by-pass duct 12 and its control valve 13, the recirculating duct 9 and its control valve 10, and the operation of the valves 23 and 24, the maximum amount of heat at most nearly uniform temperature consistent with the high efficiency of the engine may be obtained.

Having thus described our invention, we claim:

1. In a motor vehicle having a closed body and a water cooled engine, an exhaust heat exchanger arranged to be heated by the exhaust products from the engine, a water heat exchanger connected in the water cooling system of the engine, and means to force a stream of air into the body through the exhaust heat exchanger and the water heat exchanger progressively, and means to by-pass the air from said means around one of said exchangers.

2. In a motor vehicle having a closed body and a water cooled engine, means forming air passages for confining the passage of air therethrough, said means including an inlet portion and a discharge portion, an exhaust heat exchanger arranged to be heated by the exhaust products from the engine located in heat exchange relation with the air in said passages, a conduit by-passing air around said exhaust heater communicating at its inlet and outlet ends with said first mentioned means, means to control the flow of air through said conduit, a water heat exchanger connected in the water cooling system of the engine located in heat exchange relation with the air in said passages after the air has passed out of the heating relation with the exhaust heat exchanger and beyond the point at which the outlet end of said conduit communicates with said first mentioned means.

3. In a motor vehicle having a closed body and a water cooled engine, an exhaust heat exchanger arranged to be heated by the exhaust products from the engine, a water heat exchanger connected in the water cooling system of the engine, means connecting said exhaust heat exchanger and said water heat exchanger in series, means to force a stream of air into the body in heat exchange relation with the exhaust heat exchanger and the water heat exchanger, and means to by-pass the air from said means around one of said exchangers.

4. In a motor vehicle having a closed body and a water cooled engine, means forming air passages for confining the passage of air therethrough, said means including an inlet portion and a discharge portion, an exhaust heat exchanger arranged to be heated by the exhaust products from the engine located in heat exchange relation with the air in said passages, a water heat exchanger connected in the water cooling system of the engine located in heat exchange relation with the air in said passages, said exhaust heat exchanger and said water heat exchanger being connected in series, a conduit by-passing air around said exhaust heater communicating at its inlet and outlet ends with said first mentioned means, and means to control the flow of air through said conduit.

WILLIAM LINTERN.
JOHN B. LINTERN.